Nov. 7, 1961 R. R. POWELL 3,008,128

SWITCHING CIRCUIT FOR MAGNETIC CORE MEMORY

Filed March 6, 1956 3 Sheets-Sheet 1

INVENTOR
Ralph R. Powell

BY Karl Benst, Louis A Kline, John T. Matlago
HIS ATTORNEYS

BY

INVENTOR
Ralph R. Powell

Carl Berest
Louis A Kline
John J. Matlago
HIS ATTORNEYS

INVENTOR
Ralph R. Powell

BY Carl Beust, Louis A. Kline, John T. Matlago
HIS ATTORNEYS

United States Patent Office 3,008,128

Patented Nov. 7, 1961

3,008,128

SWITCHING CIRCUIT FOR MAGNETIC CORE MEMORY

Ralph R. Powell, Los Angeles, Calif., assignor to The National Cash Register Company, Dayton, Ohio, a corporation of Maryland Filed Mar. 6, 1956, Ser. No. 569,902
4 Claims. (Cl. 340—174)

This invention relates to magnetic core memory devices and more particularly to a novel switching circuit arrangement for use with such memory devices.

It has heretofore been the practice to utilize core switching for selecting cores of a static magnetic core matrix. However, core switching is generally considered inefficient in that it requires high power, and causes related circuit complications. The present invention thus contemplates a more direct approach for selecting the cores of a static magnetic core memory which utilizes transistor switches.

The junction transistor is used herein in a manner fundamentally analogous to a switch because it essentially serves to complete the connections in an electrical circuit. For example, in the present invention, a row of cores in a matrix has a lead passing therethrough which connects a pulse source to the collector of the transistor switch having a grounded emitter. When the base of the transistor is suitably pulsed, the transistor acts as a closed switch enabling current pulses to pass from the source through the transistor to ground, thus tending to drive the cores in the row to the desired state. When the base of the transistor is not pulsed, the transistor acts essentially as an open switch and the current pulses from the source are not gated through the transistor to drive the cores in the row. In order to operate in this manner, the gate control pulses applied to the base of the transistor are applied prior to the transistor receiving pulses from the current pulse source. Consequently, the pulses from the pulse source have good rise and fall times because carriers are preinjected into the base of the transistor prior to applying collector voltage thereto. This switch circuit thus provides a high-speed current switching with but a minimum of current applied to the transistor base.

The present invention further provides a novel circuit arrangement for selecting and driving the cores of a memory matrix by directing a reading pulse source through a first lead passing through a row of cores and directing a restoring pulse source through a second lead passing through the same row of cores. The other end of each of these two leads is then connected to the collector of the transistor switch which functions to close the circuit to the other side of the pulse sources whenever the base thereof is properly pulsed. This arrangement makes it possible for the same transistor switch to perform the coordinate selection function for both the reading and restoring operations.

It is accordingly in object of this invention to provide a novel, simplified transistor switching arrangement for magnetic core memories.

It is another object of this invention to provide a transistor switch circuit for selecting the cores of a static magnetic memory, the operation of this circuit being substantially independent of transistor parameters.

Another object of this invention is the provision of a transistor switch circuit arrangement whereby the same transistor switch is operable to select the core for both the reading and restoring operation cycles of the memory.

These and other objects of this invention as well as a better understanding and comprehension thereof can be obtained from the following description and drawings in which.

Figures 1, 2, 3:
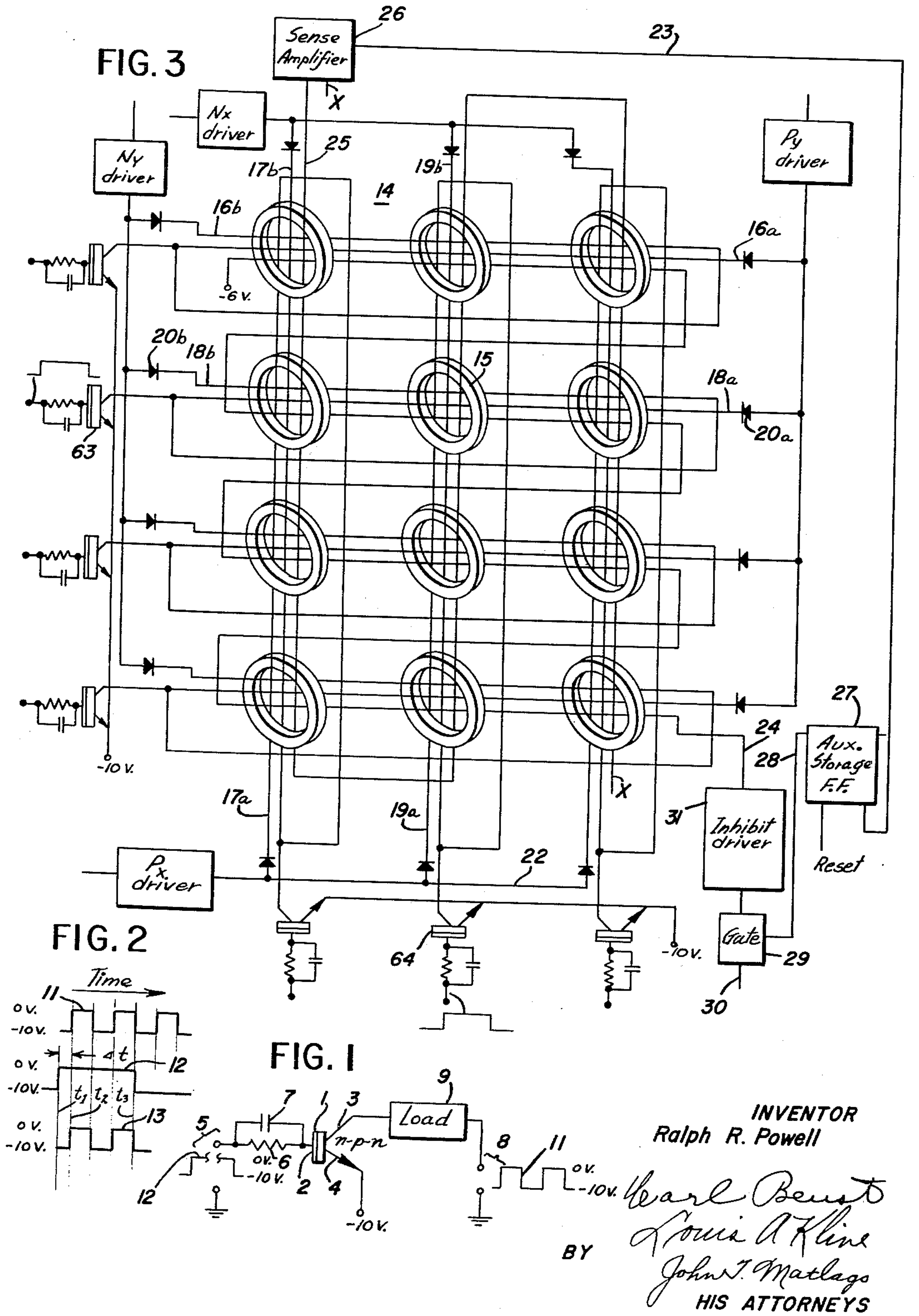
FIG. 1 is a diagram of the transistor switch utilized in the present invention.
FIG. 2 shows waveforms explaining the operation of the transistor switch shown in FIG. 1.
FIG. 3 is a diagram of a static magnetic core matrix showing how the transistor switching circuits and pulse sources are connected for selecting and driving a core of the matrix.

Referring first to FIG. 1, a schematic diagram is shown of an n-p-n type junction transistor 1 having its base 2 connected to a control input 5 by way of current limiting resistor 6 and parallel capacitor 7. The collector 3 of the transistor is connected through load 9 to a driving input 8, and emitter 4 is connected to a fixed potential of −10 v. Generally stated, an n-p-n type junction transistor requires means to bias its base positive relative to the emitter and means to bias its collector positive relative to the emitter in order for conduction to take place therethrough. Thus, with emitter 4 connected to a fixed potential of −10 v., high level voltage pulses 11 applied on driving input 8 are controlled to energize load 9 in accordance with the voltage level of pulses 12 on control input 5. Thus, when control input 5 is at the potential of −10 volts, the transistor 1 is cut off and pulses 11 on driving input 8, swinging between −10 and 0 volts, are prevented from passing therethrough. However, when control input 5 is at the potential of 0 volts, input pulses 11 are switched through load 9. It is to be noted that in this manner, taking advantage of the amplification factor of the junction transistor, relatively high current input pulses 11, e.g., 40 ma., can be controlled by means of a low control pulse 12, e.g., 1 ma. This circuit thus provides means to switch current pulses in a circuit without exceeding the power ratings of a given switching transistor.

The operation of the transistor switching circuit will be better understood by reference to the waveform diagram of FIG. 2 showing the timing relation of the input pulses 11 and the control pulses 12. As shown in the diagram, the leading edge of control pulse 12 rises at time $t_1$ which is prior to the leading edge of the first input pulse 11 occurring at time $t_2$. The lapse of time $\Delta t$ is sufficient to generate carriers within transistor 1. Thus only a small current, e.g., 1 ma., is required of control input 12 in order to control the relatively large, e.g., 40 ma., current input pulses 11, owing to the current amplification factor of transistor 1. Transistor 1 will remain closed, i.e., conduct current, until control input 12 returns to its −10 volts level at time $t_3$, at which time carrier injection into the base 2 ceases, and transistor 1 is effectively opened. As many high current input pulses 11 as desired can be switched across load 9 in accordance with the duration of the high voltage level of low current applied on control input 5. The pulses gated through the transistor are designated by the reference numeral 13 in FIG. 2. It is to be noted that voltage-current relationships, as expressed in the foregoing description, are purely illustrative, other magnitudes thereof being possible in accordance with the particular circuit parameters utilized.

An application of the circuit just disclosed is in a switching circuit arrangement provided for the memory matrix shown in FIG. 3.

It is to be noted that a core memory matrix 14 is, of itself, well known in the electronic computer art which teaches that an array of bistable magnetic cores, arranged in rows and columns, can be utilized as a highly effective static storage device. Basically, a core memory matrix is operated by coincident currents, i.e., in order to set any given core, such as core 15, to a desired magnetization state, means are provided for simultaneously applying current pulses to the appropriate row and column leads of the core memory matrix. It requires the additive effect of both these current pulses to switch a core from one residual magnetic flux state to the other. Thus the selected core will be magnetized in a desired direction without affecting the states of the other cores in the array. Inasmuch as the state of an interrogated core is determined by changing it, a restoring cycle controlled by the read-out signal is necessary to re-establish information in the static storage device. Additional details of characteristics of bistable magnetic cores are set out and explained in prior art literature, including pages 45–47 of the January 1951 issue of "Journal of Applied Physics" (vol. 22, No. 1).

Notwithstanding the fact that memory cores are usually constructed to be of relatively small size, a relatively large amount of current is required for switching them owing to the coercivity of the core material. The circuit shown in FIG. 1 is ideally suited to this switching application because, as previously pointed out, by utilizing a junction transistor, it can control relatively large currents by means of other small currents and still maintain good rise and fall times in its output pulses, without exceeding the power dissipation rating of the particular transistor used in the switch circuit.

The magnetic core memory of the prior art ordinarily includes but one pair of coordinate windings for indexing the respective rows and columns of the core matrix. The present circuit arrangement, as shown in FIG. 3, provides two pairs of leads passing through each core of the memory matrix for effecting coordinate selection. A first set of row leads, such as leads 16*a*, 18*a*, etc., is provided for directing current pulses from the $P_y$ driver through the respective rows of cores of the matrix; and a first set of column leads, such as leads 17*a*, 19*a*, etc., is provided for directing current pulses from the $P_x$ driver through the respective columns of cores of the matrix. These first sets of row and column leads are core coordinate energized leads used to select a core of the matrix such that data stored in the core can be sensed on signal sensing lead 25. As previously described, after reading out or sensing a selected core, the system provides for restoring the status of the core. Thus a second set of row leads, such as 16*b*, 18*b*, etc., is provided for directing current pulses from the $N_y$ driver through the respective rows of cores in the matrix; and a second set of column leads, such as leads 17*b*, 19*b*, etc., is provided for directing current pulses from the $N_x$ driver through the respective column of cores in the matrix. These second sets of row and column leads are provided for restoring the status of the interrogated core in accordance with the signal read out as a result of the first sets of leads being pulsed, in a manner to be hereinafter described.

In order to effect the selection of a particular core in the memory, each of the rows of cores in the matrix 14 is provided with a transistor switch, such as transistor switch 63. Similarly, each of the columns of cores in the matrix is provided with a transistor switch, such as transistor switch 64. These transistor switches are arranged to function in the same manner as the circuit described in FIG. 1.

Each pair of row leads described, such as row leads

18*a* and 18*b*, for example, is connected to the collector of the switching transistor 63 provided for that row of the matrix 14; and similarly, each pair of the column leads described, such as column leads 19*a* and 19*b*, for example, is connected to the collector of the transistor switch 64 provided for that column of the matrix 14.

It should be noted that a diode, such as diodes 20*a* and 20*b*, connects each of the leads, such as leads 18*a* and 18*b*, to the common output of the $P_y$ and $N_y$ drivers, respectively. This circuit arrangement enables the same transistor switch to be operable for both the reading and restoring cycles in the memory. In other words, by utilizing separate sources of positive pulses for the reading and restoring cycles and directing one pulse source through one direction of a row of cores and directing the other pulse source through the other direction of the same row of cores, it is possible to have the same transistor switch function for both the reading and restoring cycles.

As is well understood in the prior art, concomitant with the selecting of a core of the memory, a read-out signal is generated on sensing lead 25, common to all cores of the matrix 14. This read-out signal controls the application of a pulse to an inhibit lead 24 passing through all the cores of the matrix. This inhibit pulse if present in the matrix 14, nullifies the effect of the restoring pulse received on the second set of row leads 16*b*, 18*b*, etc., by setting up an opposing flux so as to prevent the interrogated core from changing state during the restoring cycle of the memory operation. A signal is read out of the matrix from signal sensing lead 25 only if the interrogated core is storing a "one." This output signal is sensed by sense amplifier 26 and is connected by line 23 to trigger an auxiliary flip-flop 27 such that its "zero" output 28 is now low in potential. This action closes gate 29, preventing an inhibiting pulse applied on gate input 30 from energizing the inhibit driver 31. As a consequence, the simultaneous current pulses received on the second sets of coordinate leads from sources $N_x$ and $N_y$ are enabled to re-establish the status of the core being interrogated.

Figure 4:
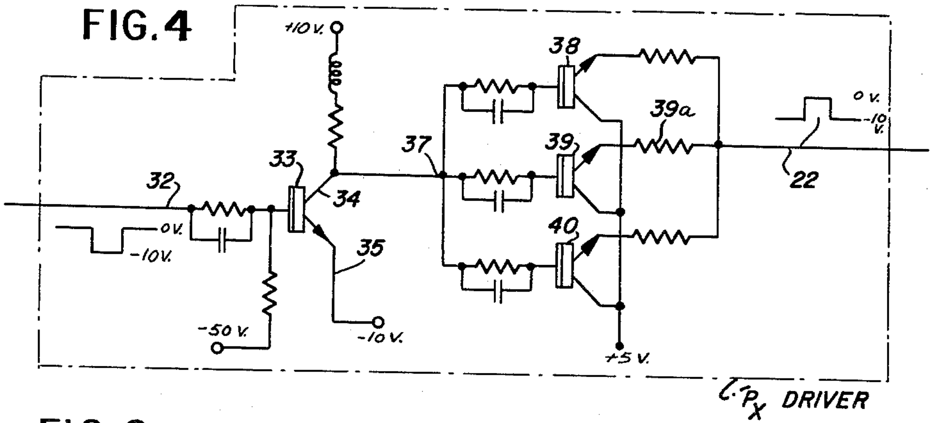
FIG. 4 is a schematic diagram of a typical driver circuit, such as the $P_x$ driver shown in FIG. 3.

Before further describing the operation of the memory matrix, the remaining circuitry indicated by the block diagram in FIG. 3 will be described. Each of the drivers, such as driver $P_x$, comprises a circuit as shown in FIG. 4. When the base input 32 of the n-p-n junction transistor 33 is at 0 volts, the transistor conducts, keeping its collector 34 at the low potential of its emitter 35, e.g., −10 v. Thus the common base input 37 of the three parallel transistors 38, 39, and 40 is low, cutting off current flow through them. As a consequence, the output 22 of the driver is held at the low potential of −10 v. However, when a negative pulse (−10 v.) is applied to the base of transistor 33, it cuts off the flow of current therethrough, thus bringing the common base input 37 of the parallel transistors to the high potential of +10 v. Thus a positive driving current pulse is caused to flow from the +5 v. source connected to the collectors of the parallel transistors, through their emitter resistors, such as resistor 39*a*, to the lead passing through the cores in the matrix connected to the output 22 of the driver.

Figure 5:
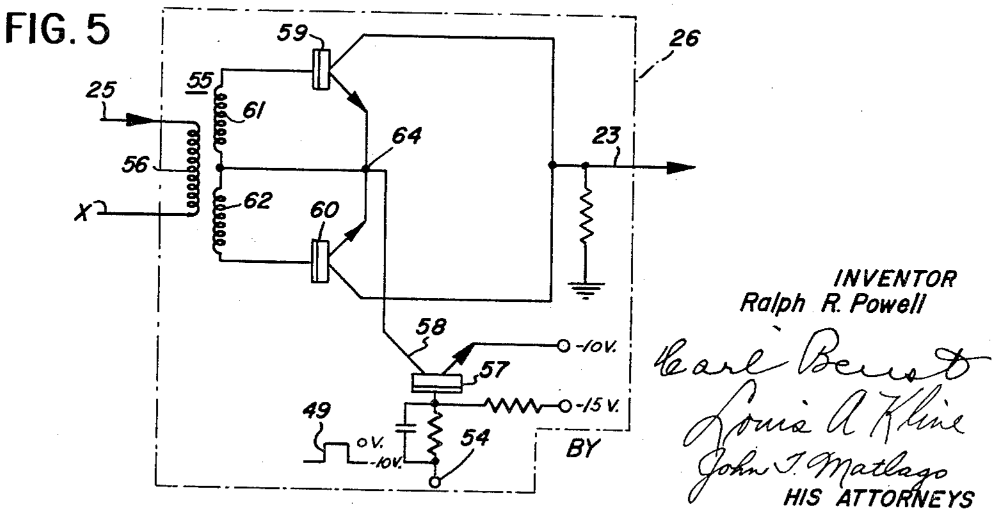
FIG. 5 is a schematic diagram of the sense amplifier.

The sense amplifier 26 shown in FIG. 5 includes a step-up transformer 55 whose primary winding 56 responds to the pulse created by switching a core from a "one" to a "zero" status. It should be noted that sense lead 25 is connected so as to form a closed loop with the primary winding 56. This arrangement prevents the setting up of any capacitive pickup in the circuit such as would occur if a grounded connection were provided. An n-p-n control transistor 57, which is normally cut off, has its collector 58 connected to the common emitter junction 64 of the pair of n-p-n transistors 59 and 60 connected across the secondary windings 61 and 62 of the transformers.

When a positive strobe pulse 49 is applied to the base 54 of the n-p-n control transistor 57, this transistor is saturated, enabling one of the pair of transistors 59 and 60 to conduct in response to a pulse on sense winding 25 to produce a pulse on output 23 for triggering the auxiliary flip-flop 27. However, in the absence of a pulse on sense winding 25, the pair of transistors 59 and 60 do not conduct and no pulse appears on the output 23 of the sense amplifier 26.

Figure 6:
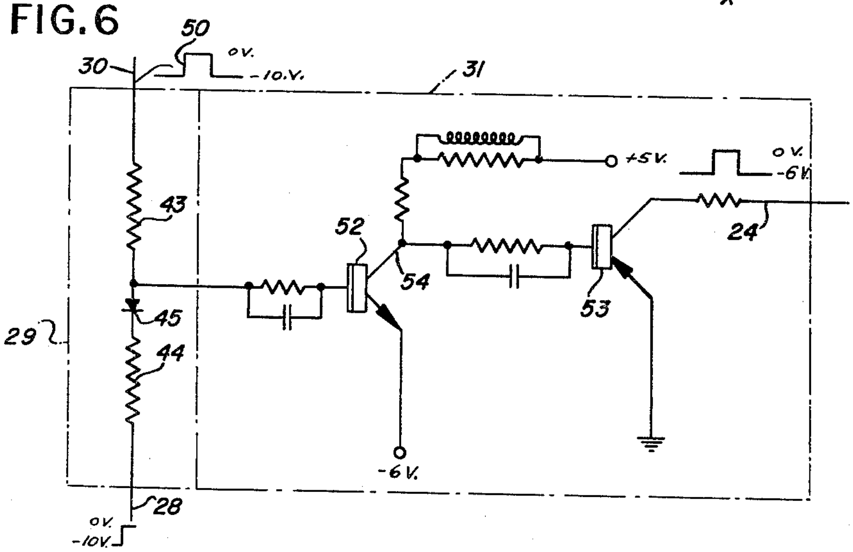
FIG. 6 is a schematic diagram of the inhibit driver and gating circuit.

The detailed circuitry for the inhibit driver 31 and gate 29 shown in block form in FIG. 3 will next be described in FIG. 6. As shown, the gate 29 is comprised of two series-resistors 43 and 44 interconnected by a diode 45. As previously discussed, when a "one" pulse is sensed by the sense amplifier 26, the auxiliary flip-flop 27 is triggered to a "one" state. Thus a low voltage of −10 v. is applied to the lower end of resistor 44. For this condition, when a positive inhibit pulse 50 is received on the upper end of resistor 43, the diode 45 passes current so as to cut off conduction in the n-p-n transistor 52 of sense amplifier 26. As a result, the p-n-p transistor 53, whose base input is connected to the collector 54 of transistor 52, is maintained in a cut-off condition. Under these conditions, no pulse is generated on the inhibit lead 24 of the memory matrix 14. This enables a "one" to again be set up in the core being interrogated by the $N_x$ and $N_y$ current pulses.

When a "zero" is sensed by the sense amplifier 26, the auxiliary flip-flop 27 remains in a "zero" state and the "zero" output 28 thereof remains high in potential. The potential on the lower end of resistor 44 is consequently 0 volt. Thus, when a positive inhibit pulse 50 is now applied on the upper end of resistor 43, the back bias on the series diode 45 persists since the greatest voltage drop is across the resistor 43 of the gate 30. Thus the positive inhibit pulse 50 raises the potential on the base of the normally non-conducting transistor 52, causing it to be saturated. Thus the lower potential on the base of transistor 53, which is normally non-conducting, causes a pulse to be gated onto lead 24, inhibiting the restoration of a "one" status to the interrogated core.

Figure 7:
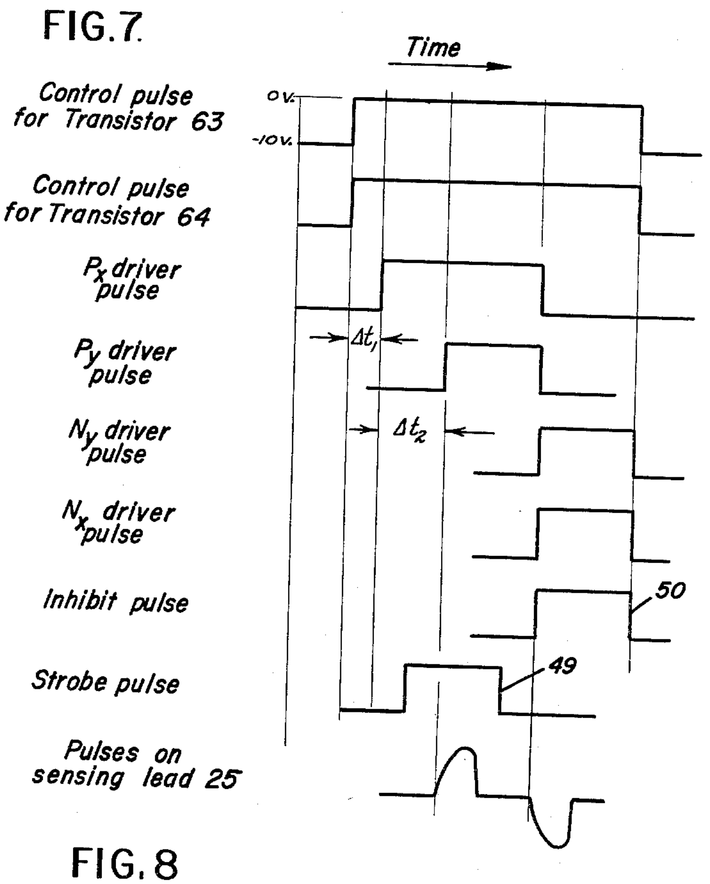
FIG. 7 is a diagram showing the relationship of the waveforms employed for operating the memory core matrix of FIG. 3.

The operation of the memory will next be further clarified by reference to the waveforms in FIG. 7. First, in order to select a particular core in the matrix 14, the appropriate row selective transistor and column selective transistor, such as 63 and 64, respectively, must have positive pulses simultaneously applied thereto, prior to the receipt of the core driving pulses as shown in the time-voltage graph in FIG. 7.

The transistor switches, after a slight time delay $\Delta t_1$, are now effectively closed, permitting the passage of driving pulse $P_x$ on lead 19a and, at a time $\Delta t_2$ thereafter, of a driving pulse $P_y$ on lead 18a. Now the combined current amplitude of timed pulses $P_x$ and $P_y$ provides sufficient current on the lead intersection of core 15 which is assumed to be storing a "one," for example, to exert a magnetomotive force exceeding the knee of the characteristic hysteresis loop curve thereof. However, the currents applied at the other lead intersetcions of the remaining cores in the matrix are insufficient to exceed the knee of their operating curves. Thus the selected core 15 is magnetized in the "zero" direction while the magnetization states of the other cores in the matrix remain unchanged.

The four driving current pulses $P_x$, $P_y$, $N_x$, and $N_y$, utilized to operate the present memory, have the relative waveforms shown in FIG. 7. As previously described, these pulses have the proper phase and width relationship to effect memory operation by first reading out information from the memory by use of the $P_x$ and $P_y$ drivers and, secondly, restoring the information back into the memory by the use of the $N_x$ and $N_y$ drivers. As previously explained, each core of the matrix 14 has two pairs of coordinate leads passing therethrough and positive current pulses travel in opposite directions in each respective pair of leads owing to circuit orientation. Thus, assuming core 15 is to be selected, a coincidence of signals in one pair of coordinate leads, e.g., leads 18a and 19a, has an additive effect and serves to trigger a core into a "zero" status, for example; similarly, a subsequent coincidence of signals on the other pair of leads, e.g., leads 18b and 19b, triggers this same core to a "one" status, providing the action is not inhibited, as will be explained subsequently.

It should be noted here that the sense lead 25 is wound parallel to the leads 17a, 19a driven by the $P_x$ driver. Because of this, a large amount of noise is induced in sense lead 25 when the $P_x$ current is applied. Therefore, as is well understood in the prior art, the $P_x$ driver current is applied early, as shown in FIG. 7, so that time is allowed for transients to die down before the $P_y$ lead current is applied to the matrix 14. It should be obvious that no noise is induced on application of the $P_y$ current as the leads driven thereby are arranged perpendicular to the sense lead 25. If the core selected in this manner is in the "one" state, a pulse will be seen at this time on the sense lead 25. If the core is in the "zero" state, no pulse will be seen on the sense lead 25 at this time. In order to keep the system from interpreting the noise due to the application of the $P_x$ driver current pulse as a "one," the sense amplifier 26 is made active, e.g., it will amplify signals on sensing lead 25, only during the interval that the strobe pulse 49 (FIGS. 5 and 7) is present.

The restoring pulses $N_x$ and $N_y$ appear on leads 19b and 18b immediately after the termination of simultaneously applied pulses $P_x$ and $P_y$, as shown in FIG. 7. It is to be noted that concurrent pulse $N_y$ is effective during the restoring cycle only in the absence of any inhibit pulse on lead 24 which produces an equal opposing current to that in lead 18b. An inhibit pulse will appear on lead 24 only if no voltage was induced on sensing lead 25 as controlled by the auxiliary storage flip-flop 27. In this case, the effect of a concurrent restoration pulse on $N_y$ is nullified because the current in inhibit lead 24 is opposite to that in lead 18b, thereby cancelling its magnetomotive force induction effect on core 15.

Figure 8:
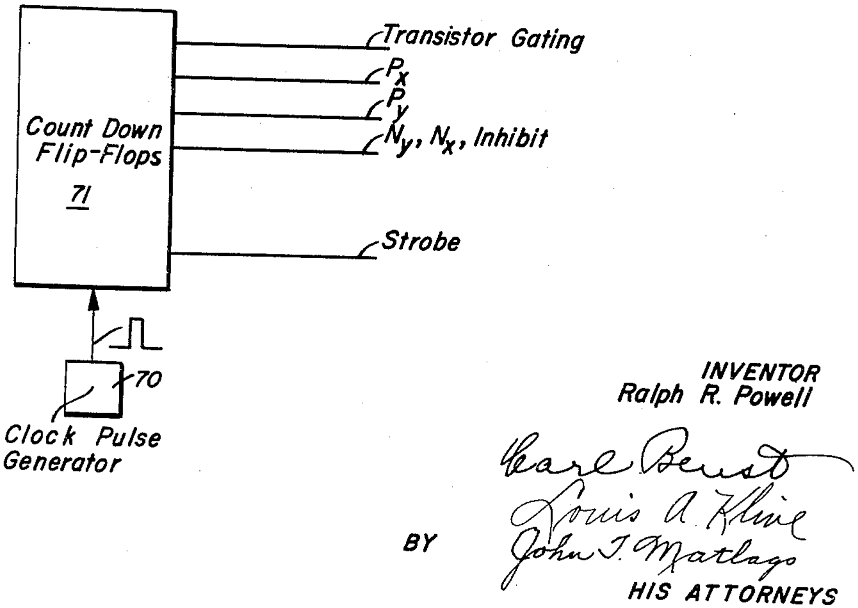
FIG. 8 is a block diagram of the circuits employed for generating the waveforms used to operate the memory matrix.

It should be obvious that the control pulses for switch transistors, the drive pulses, and the inhibit and strobe pulses must all be precisely aligned timewise relative to each other for the core memory to operate properly. The invention thus contemplates driving all of these pulses from a single clock source such as pulse generator 70, as shown in FIG. 8. The frequency of this pulse generation is made sufficiently high so that the clock pulses can operate counting flip-flops 71 whose outputs in turn can be combined, by diode networks for example, to generate the leading and trailing edge counts of the various waveforms derived, thus precisely controlling the relative timewise relationship of the various waveforms generated. The details of the count-down flip-flop circuits of this type have not been shown or described herein since they are well understood in the prior art.

Note again that the purpose of all the diodes, such as diode 20a, used in the memory system shown in FIG. 3, is to suppress any undesirable back voltage effects that might develop in the system. Physically, the cores of the matrix 14, such as core 15, might be arranged in a plurality of planes or layers in which case transistors 63 and 64, for example, could be made common to all *n* planes, thus conserving components as well as space and weight. Note further that p-n-p type transistors might be used equally well in this embodiment of the invention, providing the polarity of clock pulses were changed from positive to negative.

While the form of the invention shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. A magnetic memory device comprising: a plurality of bistable magnetic elements arranged in a matrix of rows and columns of said elements; first and second row conductors each inductively coupled to each element of a row of elements; first and second column conductors each inductively coupled to each element of a column of elements; first and second transistors each comprising a collector electrode, an emitter electrode, and a base electrode; first and second sources of read pulses; first and second sources of restore pulses; means connecting said first source of read pulses and said first source of restore pulses across the emitter and collector electrodes of said first transistor through respective ones of said first and second row conductors; means connecting said second source of read pulses and said second source of restore pulses across the emitter and collector electrodes of said second transistor through respective ones of said first and second column conductors; means including a sense conductor and an inhibit conductor each inductively coupled to each of said elements; means for applying timed control pulses across the base electrode and another of the electrodes of each of said transistors to induce timed conduction in the transistors; and means connected to said sense conductor and to said inhibit conductor for detection of an output pulse on said sense conductor and for supplying inhibit pulses to said inhibit conductor, whereby reading pulses from said sources of read pulses and restoring pulses from said sources of restoring pulses are switched by said transistors under control of said means for applying timed control pulses, and an information bit stored in one of said elements is read out onto said sense conductor and thereafter restored to said one of said elements.

2. A magnetic information-storage system comprising: a plurality of bistable magnetic elements which are functionally divided into a plurality of sets which are arbitrarily designatable as columns and each set of which includes a plurality of the said elements, and the said elements also being functionally divided into a plurality of groups which are arbitrarily designatable as rows and each group of which includes a plurality of the said elements, and the functional divisions of the said elements being such that each of the said sets sets of the elements includes one element of each of the said groups of elements and such that each of the said groups of the elements include one element of each of the said sets of elements; a set of transistors, each for and associated with a respective one of said sets of elements and arbitrarily designatable as column transistors; a group of transistors, each for and associated with a respective one of said groups of elements and arbitrarily designatable as row transistors; two-ended column drive-line pairs, each comprising first and second unidirectional column drive line means each of said pairs being for and associated with a respective one of said sets of elements and the column drive line means of any pair being inductively linked in opposition to each of the elements of the respective column and each line means of a pair having one end thereof connected for conduction of current through the associated column transistor in the same direction and the other ends of the lines of each such pair being separately terminated at respective first and second column drive-line terminals; two-ended row drive-line pairs, each comprising first and second unidirectional row drive line means each of said pairs being for and associated with a respective one of said groups of elements and the row drive line means of any pair thereof being inductively linked in opposition to each of the elements of the respective row and each line means of a pair having one end thereof connected for conduction of current through the associated row transistor in the same direction and the other ends of the lines of each such pair being separately terminated at respective first and second row drive-line terminals; first and second column drive means, each connected to a respective one of said first and second column drive-line terminals and constructed and arranged to provide respective current pulses through respective ones of the said first and second unidirectional column drive line means during respective first and second time intervals; first and second row driver means, each connected to a respective one of said first and second row drive-line terminals and constructed and arranged to provide respective current pulses through respective ones of the first and second unidirectional row drive line means during respective ones of said first and second time intervals; and means, including pulse means and sense-line means, for selectively applying pulses to selected transistors of said transistors to render the selected transistors conductive, and for utilizing a potential produced on said sense line means incident to reversal of magnetic state of one of said elements due to concurrent passage of pulses from the said second column driver means and the said second row driver means through a column drive line means inductively linked to said one of said elements.

3. A magnetic information-storage system according to claim 2, each of the unidirectional drive line means including a respective diode means for limiting passage of current pulses therethrough to a single direction.

4. A magnetic information-storage system according to claim 2, including means connected to said sense line means and comprising an inhibit line means inductively linked to all said elements, and means responsive to a potential on said sense line means to thereafter produce a current pulse through said inhibit line means.

References Cited in the file of this patent

UNITED STATES PATENTS

| | | |
|---|---|---|
| 2,734,184 | Rajchman | Feb. 7, 1956 |
| 2,739,300 | Haynes | Mar. 20, 1956 |
| 2,829,281 | Van Overbeek | Apr. 1, 1958 |
| 2,840,801 | Beter | June 24, 1958 |
| 2,843,761 | Carlson | July 15, 1958 |
| 2,849,705 | Haynes | Aug. 26, 1958 |

OTHER REFERENCES

"A Transistor Digital Fast Multiplier with Magnetostrictive Storage," by G. B. Chaplin et al., published July 1955, Proc. of the I.E.E. (Part B, vol. 102, No. 4, pages 412–424.)